US012539794B2

(12) United States Patent
Nicol et al.

(10) Patent No.: US 12,539,794 B2
(45) Date of Patent: Feb. 3, 2026

(54) VEHICLE SEAT WITH ADJUSTABLE SEAT CUSHION FOR A CHILD SEAT

(71) Applicant: Rivian IP Holdings, LLC, Irvine, CA (US)

(72) Inventors: Steven Digby Nicol, San Clemente, CA (US); Kevin Mayer, Costa Mesa, CA (US); Kirsten Bloch, Orange, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 245 days.

(21) Appl. No.: 18/346,100

(22) Filed: Jun. 30, 2023

(65) Prior Publication Data

US 2025/0001912 A1    Jan. 2, 2025

(51) Int. Cl.
 *B60N 2/32*    (2006.01)
 *B60N 2/28*    (2006.01)

(52) U.S. Cl.
 CPC .................. *B60N 2/32* (2013.01); *B60N 2/28* (2013.01)

(58) Field of Classification Search
 CPC ............. B60N 2/32; B60N 2/28; B60N 2/305
 See application file for complete search history.

(56) References Cited

U.S. PATENT DOCUMENTS

| | | | | | |
|---|---|---|---|---|---|
| 5,542,742 | A | * | 8/1996 | Fulgenzi | B60N 2/3086 |
| | | | | | 297/238 |
| 5,848,820 | A | * | 12/1998 | Hecht | B60N 3/102 |
| | | | | | 297/188.1 |
| 5,971,466 | A | * | 10/1999 | Hashimoto | B60N 2/305 |
| | | | | | 297/452.56 |
| 10,011,198 | B2 | * | 7/2018 | Theander | B60N 2/265 |
| 2012/0049590 | A1 | * | 3/2012 | Parker | B60N 2/2887 |
| | | | | | 297/257 |
| 2015/0329018 | A1 | * | 11/2015 | Mayer | B60N 2/206 |
| | | | | | 297/378.1 |
| 2018/0265010 | A1 | * | 9/2018 | Line | B60N 2/22 |
| 2020/0180476 | A1 | * | 6/2020 | Salenbien | A47C 7/58 |

* cited by examiner

*Primary Examiner* — David R Dunn
*Assistant Examiner* — Tania Abraham
(74) *Attorney, Agent, or Firm* — BAKERHOSTETLER

(57) ABSTRACT

A vehicle includes a seat that includes a displaceable seat cushion to provide space for a child seat. The seat belt assembly may include a seat back and a seat cushion displaceable (e.g., movable) with respect to the seat back. The seat further includes a platform that, when exposed by displacing the seat cushion, provides a space for the child seat. The platform includes a pocket that holds an additional seat belt receptacle, thereby allowing a standalone seat belt to pass through the child seat and connect to a pair of seat belt receptacles of the seat. The displaceable seat cushion increases the clearance between the child seat and a door frame, thus facilitating movement a child into and out of the vehicle.

20 Claims, 14 Drawing Sheets

VEHICLE SEAT WITH ADJUSTABLE SEAT CUSHION FOR A CHILD SEAT

INTRODUCTION

A seat assembly may include a movable seat cushion that, when moved, provides a platform for a child seat. The seat assembly may be used with vehicles.

SUMMARY

This application is directed to seats for vehicles, and more particularly, to a movable seat cushion to accommodate a child seat. By moving the seat cushion, the child seat may be placed on a platform previously covered by the seat cushion. Based upon moving the seat cushion, additional space may be provided for the child seat.

In accordance with one or more aspects of the disclosure, a seat assembly is described. The seat assembly may include a platform. The platform may include a seat belt receptacle. The platform may further include a surface. In a first position, the platform may be covered by a seat cushion. In a second position, the platform may be uncovered by the seat cushion, thereby permitting access to i) the surface for a child seat and ii) the seat belt receptacle for securing the child seat to the platform at the surface.

The platform may further include a guide rail and a slide coupled to the guide rail and the seat cushion. The slide may be movable along the guide rail from the first position to the second position. The seat belt receptacle may be covered by the seat cushion in the first position.

The seat assembly may further include a pocket formed in the platform. The seat belt receptacle may be located within the pocket.

The seat assembly may further include a supplemental seat belt that includes a first end and a second end opposite the first end. The supplemental seat belt may be configured to pass through the child seat. The seat assembly may further include a second seat belt receptacle. In the second position, the first end may be configured to couple to the seat belt receptacle and the second end may be configured to couple to the second seat belt receptacle.

The seat assembly may further include further a seat back. The seat cushion may be configured to rotate relative to the seat back.

The platform may allow the seat cushion to rotate from the first position to the second position. The seat cushion may be configured to move from the first position to the second position in response to actuation of a button.

The seat assembly may further include a seat lock configured to secure the seat cushion in the first position.

In accordance with one or more aspects of the disclosure, a seat assembly is described. The seat assembly may include a platform configured to removably couple with a vehicle. The seat assembly may further include a seat back coupled to the platform. The seat assembly may further include a seat cushion coupled with the platform. The seat cushion may be configured to move relative to the seat back, thereby exposing the platform for a child seat.

The seat cushion may be configured to rotate relative to the seat back. The seat cushion may be configured to move laterally with respect to the seat back.

The seat assembly may further include a first seat belt receptacle configured to secure with a first end of a belt that passes through the child seat. The seat assembly may further include a pocket formed in the platform. The seat assembly may further include a second seat belt receptacle located in the pocket. The second seat belt receptacle may be configured to secure with a second end of the belt.

In accordance with one or more aspects of the disclosure, a vehicle is described. The vehicle may include a front seat. The vehicle may further include a rear seat located behind the rear seat. The rear seat may include a seat back. The rear seat may further include a seat cushion configured to move i) in a first direction away from the seat back, and ii) in a second direction different from the first direction. The vehicle may further include a platform configured to receive a child seat subsequent to the seat cushion moving in the second direction.

The seat cushion is configured to rotate in the second direction. The rear seat is adaptable to be positioned in at least one of a driver's side of the vehicle, a passenger's side of the vehicle, or a middle of the vehicle.

The platform may include a pocket. The platform may further include a seat belt receptacle located in the pocket. The pocket and the seat belt receptacle may be exposed subsequent to the seat cushion moving in the second direction.

The vehicle may further include a button. In response to actuation of the button, the seat cushion may move in the first direction and subsequently in the second direction.

The vehicle may further include a touch display. In response to a touch input to the touch display, the seat cushion may move in the first direction and subsequently in the second direction.

BRIEF DESCRIPTION OF THE DRAWINGS

Certain features of the subject technology are set forth in the appended claims.

However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The subject technology is directed to seat assemblies in which one or more seat cushions may be displaced. In one or more implementations, the seat cushion may be displaced in order to provide a space for a child seat. For example, a seat assembly may include a platform (previously covered by the seat cushion) that provides a planar, or substantially planar, surface for the child seat. Beneficially, the displaced seat cushion provides additional clearance between the child seat and a door frame of the vehicle, thus increasing the ease of placing a child in the child seat. Additionally, the seat assembly may include an additional seat belt receptacle. In this regard, a seat belt (e.g., standalone seat belt) designed to pass through a designated opening of a child seat may be provided with the seat assembly. Once adjusted, the seat belt may remain in the child seat.

Figure 1:
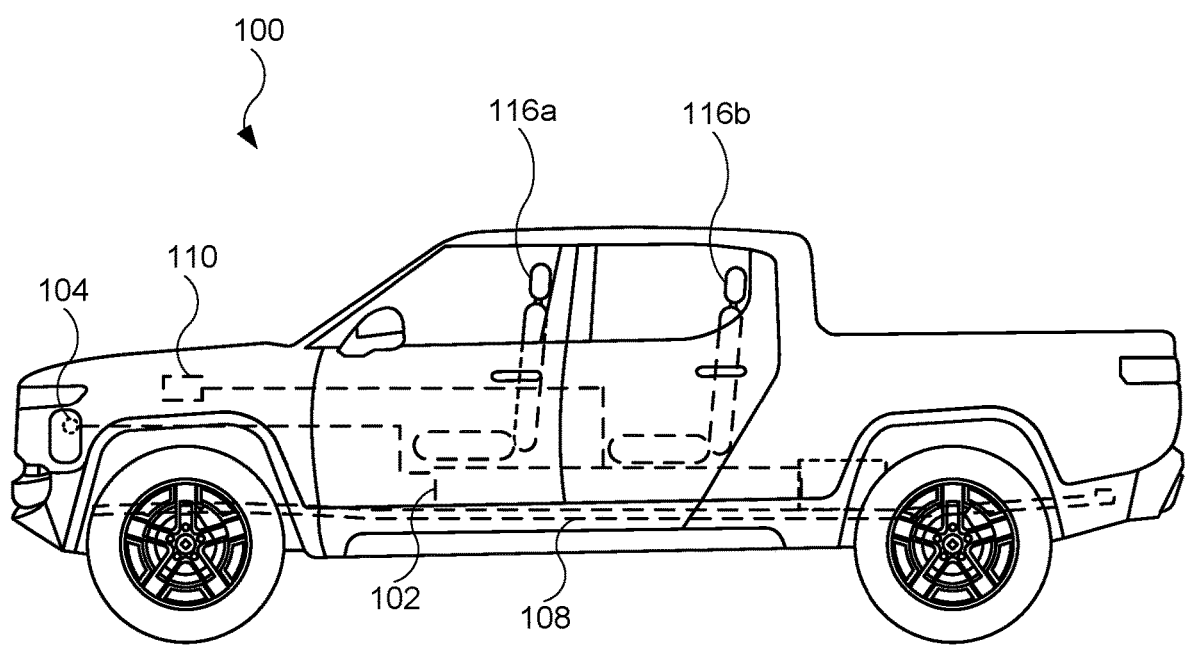
FIG. 1 illustrates an example of a vehicle, in accordance with aspects of the present disclosure.

According to one or more implementations, for example as shown in FIG. 1, an example implementation of a movable apparatus takes the form of a vehicle 100. In one or more implementations, the vehicle 100 is a sport utility vehicle (SUV). In the example shown in FIG. 1, the vehicle 100 is a truck. Generally, the vehicle 100 may take the form of any motorized vehicle, including motorized vehicles with an internal combustion engine and/or one or more electric motors. In this regard, other implementations of the vehicle 100 may include land-based vehicles, such as a car (e.g., sedan, hatchback), a van, or a commercial truck, as non-limiting examples.

As shown, the vehicle 100 includes a battery pack 102. The battery pack 102 may be coupled (e.g., electrically coupled) to one or more electrical systems of the vehicle 100 to provide power to the one or more electrical systems. The vehicle 100 may further include a port 104 (e.g., charge port) designed to receive a cable connector (not shown in FIG. 1) used to transmit power (e.g., AC power) that is converted to DC power to charge the battery pack 102. The vehicle 100 may include a chassis 108 used to support the battery pack 102 and various other components (not shown in FIG. 1) of the vehicle 100, such as the suspension and differential, as non-limiting examples.

The battery pack 102 may couple to a drive unit 110, representative of one or more drive units. The drive unit 110 may include, for example, a motor, an inverter, a gear box, and a differential. In one or more implementations, the drive unit 110 is an internal combustion engine. In the example shown in FIG. 1, the drive unit 110 is an electric motor. In this regard, the drive unit 110 may use energy (e.g., electrical energy) stored on the battery pack 102 for propulsion in order to drive (e.g., rotationally drive) wheels of the vehicle 100.

Additionally, the vehicle 100 may include several seat assemblies. For example, the vehicle 100 includes a seat assembly 116a and a seat assembly 116b. The seat assembly 116a and the seat assembly 116b may be referred to as a front seat assembly and a rear seat assembly, respectively, as a non-limiting example. Further, each of the seat assemblies 116a and 116b may include seats take the form of a bucket seat. Alternatively, the seat assembly 116b may take the form of a bench seat or one or more captain's seat, as non-limiting examples. Moreover, when the vehicle 100 takes the form of an SUV, the vehicle 100 may include three rows of seat assemblies, with an additional seat assembly behind the seat assembly 116b.

Figure 2:
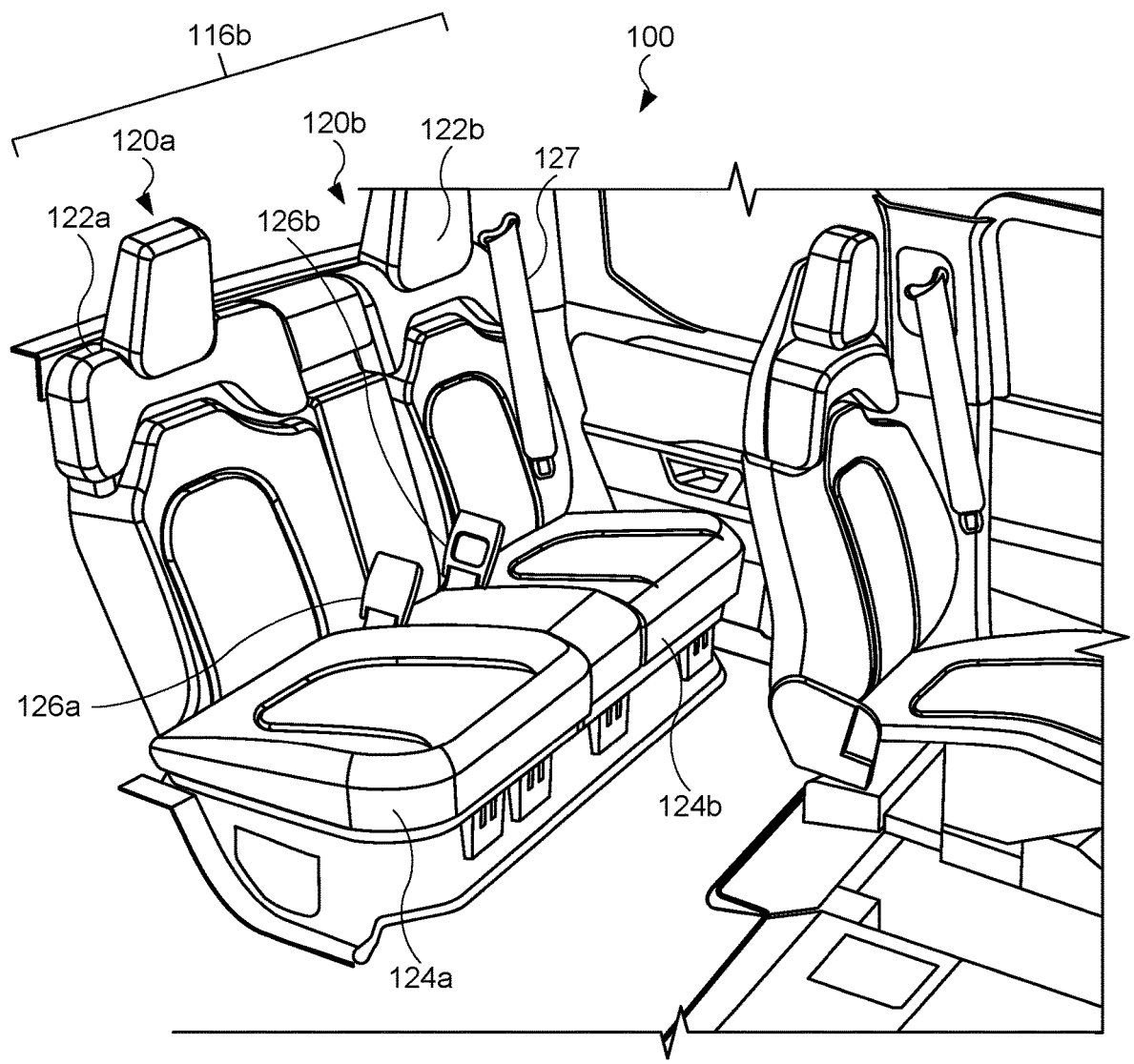
FIG. 2 illustrates a perspective view of an interior of a vehicle, showing a seat assembly of the vehicle, in accordance with aspects of the present disclosure.

Referring to FIG. 2, an interior of the vehicle 100 depicts the seat assembly 116b. As shown, the seat assembly 116b includes a seat 120a and a seat 120b. Each of the seats 120a and 120b is designed to hold a passenger in the vehicle 100. Also, the seat 120a and the seat 120b may be referred to as a rear passenger's side seat and a rear driver's side seat, as a non-limiting example. Although the seat assembly 116b includes two seats, the number of seats may vary. For example, the seat assembly 116b may include at least three seats.

Also, each of the seats 120a and 120b may include one or more seat features. For example, the seat 120a includes a seat back 122a and a seat cushion 124a, and the seat 120b includes a seat back 122b and a seat cushion 124b. Each of the seat backs 122a and 122b may be referred to as a back rest. In one or more implementations, at least one of the seat cushion 124a or the seat cushion 124b is a displaceable seat cushion (e.g., movable seat cushion) designed to move with respect to the seat back 122a or the seat back 122b, respectively. Examples of displaceable seat cushions will be shown and described further below. Also, each of the seats 120a and 120b includes a seat belt receptacle 126a and a seat belt receptacle 126b, respectively. In one or more implementations, the seat belt receptacles 126a and 126b are designed to secure a respective seat belt in the vehicle 100. For example, the seat belt receptacle 126b is designed to secure with the seat belt 127, and in particular, a buckle of the seat belt 127. Although not shown, an additional seat belt can be secured with the seat belt receptacle 126a.

Figure 3:
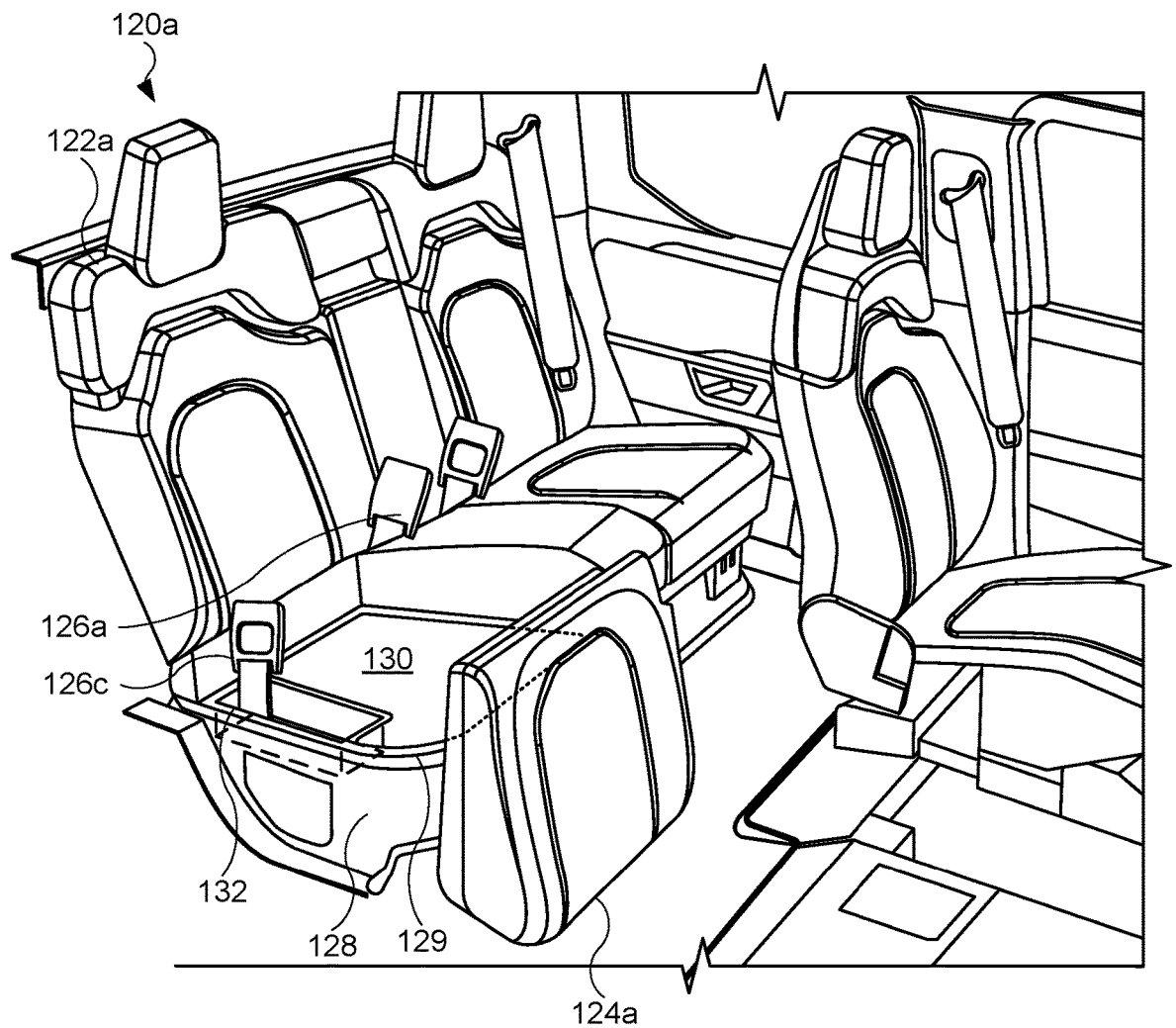
FIG. 3 illustrates a perspective view of a seat assembly, further showing displacement of a seat cushion of the seat assembly, in accordance with aspects of the present disclosure.

Referring to FIG. 3, the seat cushion 124a of the seat 120a is displaced. As shown, the seat cushion 124a is moved relative to the seat back 124a. When the seat cushion 124a is displaced, a platform 128 of the seat 120a is exposed. The platform 128 may include a surface 129 (e.g., upper surface) that takes the form of a planar (e.g., flat), or generally planar, surface. In one or more implementations, the platform 128 provides a location for a child seat (not shown in FIG. 2).

Further, the platform 128 may include a modular platform and separate from a platform of the seat 120b. Alternatively, the platform 128 may represent a support platform for both of the seats 120a and 120b. In one or more implementations, the mat 130 includes a liquid-resistant (or materials), such as rubber or another polymer-based compounds. Further, a mat 130 may be positioned on the surface 129 of the platform 128. When a child seat is placed on the platform 128 at the surface 129, the mat 130 may be positioned between the child seat and the platform 128. Beneficially, in the event a child seated in the child seat drops items such as food or liquid, the mat 130 may catch and/or repel the items.

Additionally, the seat 120a may include a pocket 132 (e.g., compartment) formed in the platform 128. In one or more implementations, the pocket 132 provides a space or volume for a seat belt receptacle 126c. In this regard, the seat belt receptacle 126c may be stowed in the pocket 132 and covered by the seat cushion 124a prior to displacement of the seat cushion 124a. As shown, however, when the seat cushion 124a is displaced, the seat belt receptacle 126c may extend from the pocket 132. It should be noted that the seat belt receptacle 126c, while being located in the pocket 132, may be secured within the pocket 132 based on industry standards for securing seat belt receptacles to seats.

Figure 4:
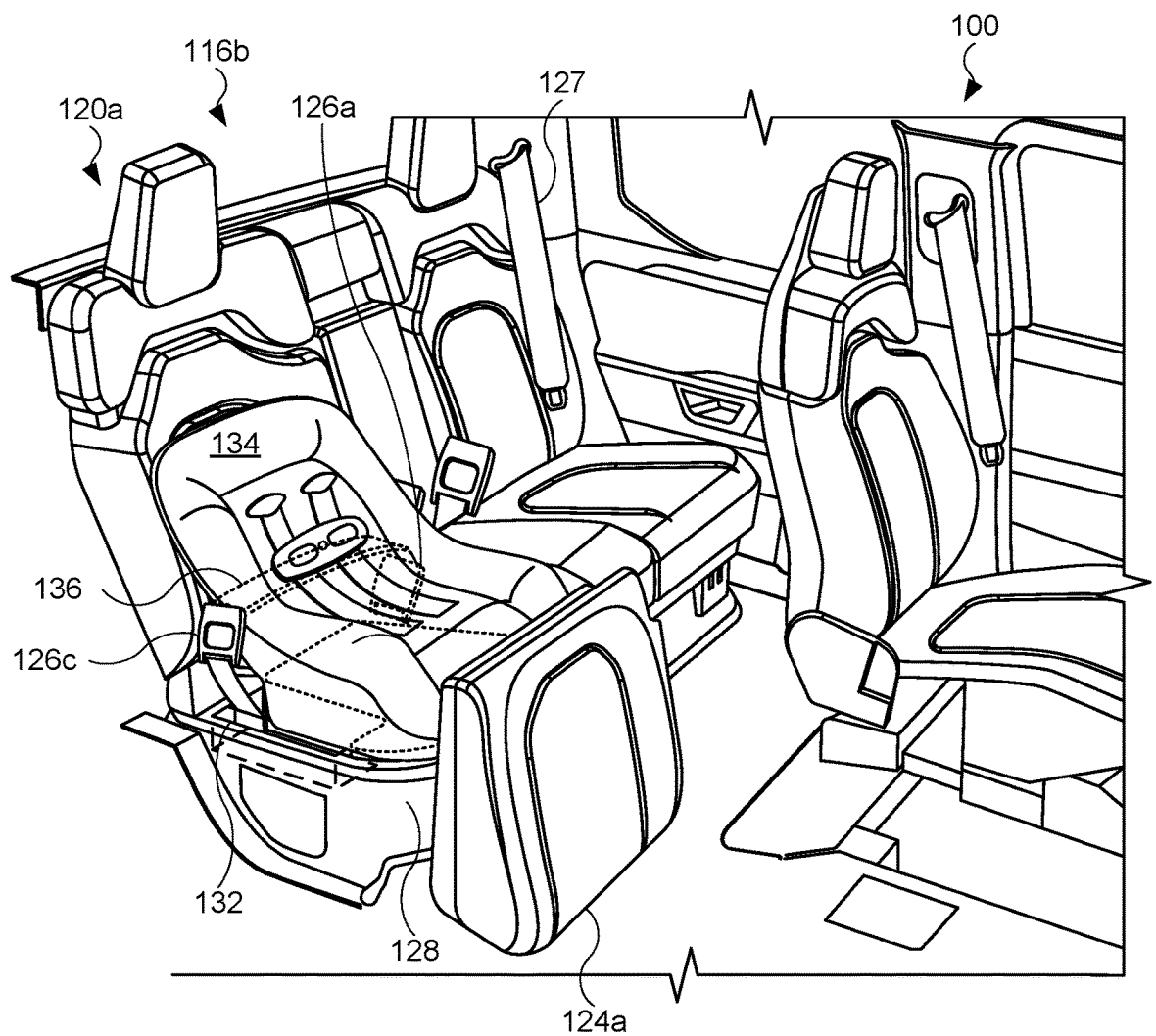
FIG. 4 illustrates a perspective view of a seat assembly, further showing displacement of a seat cushion of the seat assembly and a child seat positioned on a platform of the seat assembly, in accordance with aspects of the present disclosure.

Referring to FIG. 4, a child seat 134 is positioned on the platform 128 (shown as dotted lines). Further, a supplemental seat belt 136 (shown as dotted lines) may be provided with the seat assembly 116b, and in particular, with the seat 120a. The supplemental seat belt 136 may extend through an opening (not shown in FIG. 4) of the child seat 134 and may be buckled to the seat belt receptacle 126a (shown as dotted lines) and the seat belt receptacle 126c. Accordingly, the seat belt receptacles 126a and 126c provide respective connection points for the supplemental seat belt 136, with the seat belt receptacle 126c capable of being used for a child seat application and otherwise stowed when not in use.

Figure 5:
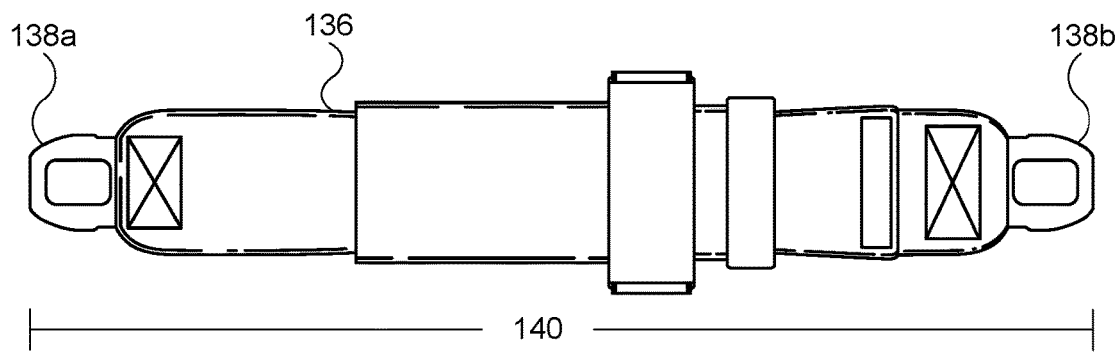
FIG. 5 illustrates a supplemental seat belt for a child seat, in accordance with aspects of the present disclosure.

Referring to FIG. 5, the supplemental seat belt 136 includes a buckle 138a and a buckle 138b. The buckle 138a and the buckle 138b are designed to mate with the seat belt receptacle 126a and the seat belt receptacle 126c, respectively, shown in FIG. 4. Moreover, the buckles 138a and 138b may include the same design and form factor as those of a buckle for a seat belt in the vehicle 100 (e.g., seat belt 127 of the vehicle 100 shown in FIG. 4). As a result, the seat belt receptacles 126a and 126c (shown in FIG. 4) can be not only be used with traditional seat belts but also with the supplemental seat belt 136, which is designed for use with child seats. Also, due to the same design and form factor, each of the buckles 138a and 138b can be reversed and secured by the seat belt receptacle 126c and the seat belt receptacle 126a, respectively, making the supplemental seat belt 136 an omnidirectional seat belt.

Additionally, the supplemental seat belt 136 includes a dimension 140 (e.g., end-to-end length). However, the dimension 140 may be adjustable, thus allowing the supplemental seat belt 136 to be universal, e.g., used with a variety of child seat manufactures and with several types of child seats (e.g., infant child seats, toddler child seats). In this regard, once the dimension 140 is adjusted to fit within a child seat (e.g., as shown in FIG. 4 with the child seat 134) and secured with the seat belt receptacles 126a and 126c, the supplemental seat belt 136 may remain with a child seat after the dimension 140 of the supplemental seat belt 136 is adjusted.

Figure 6:
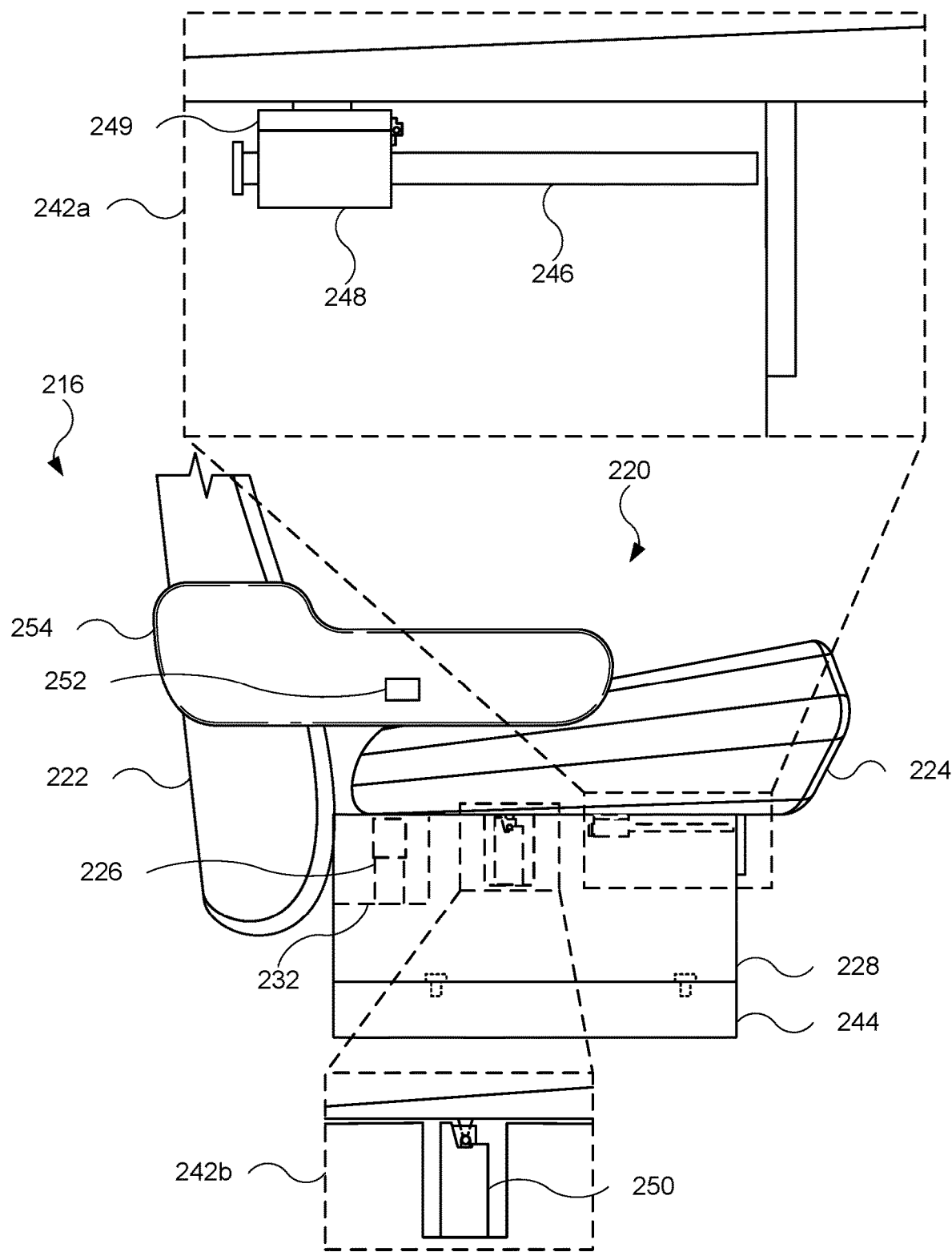
FIG. 6 illustrates a side view of a seat assembly, in accordance with aspects of the present disclosure.
Figure 7:
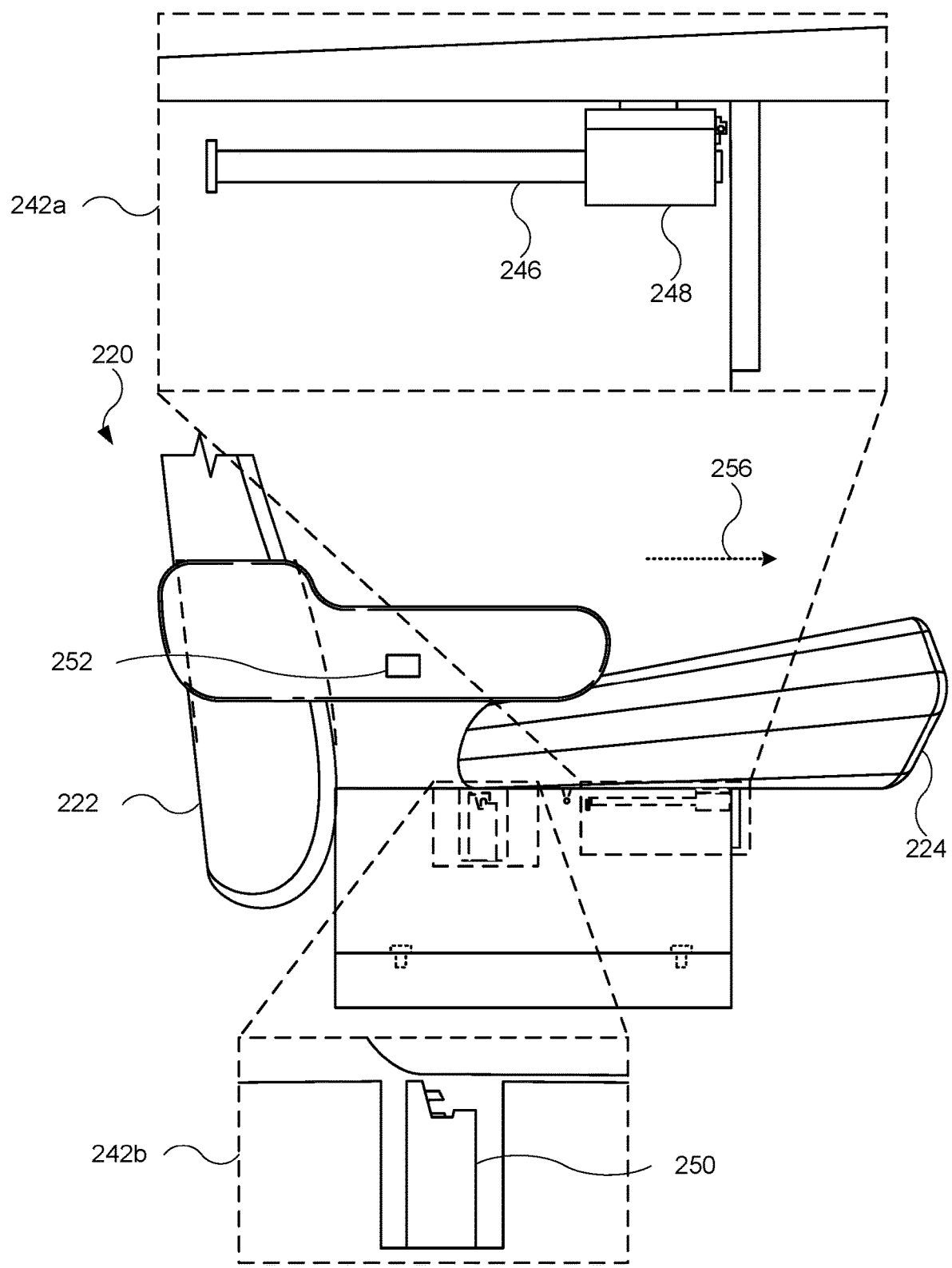
FIG. 7 and FIG. 8 illustrate side views of a seat assembly, showing exemplary movement of a seat cushion of the seat assembly, in accordance with aspects of the present disclosure.
Figure 8:
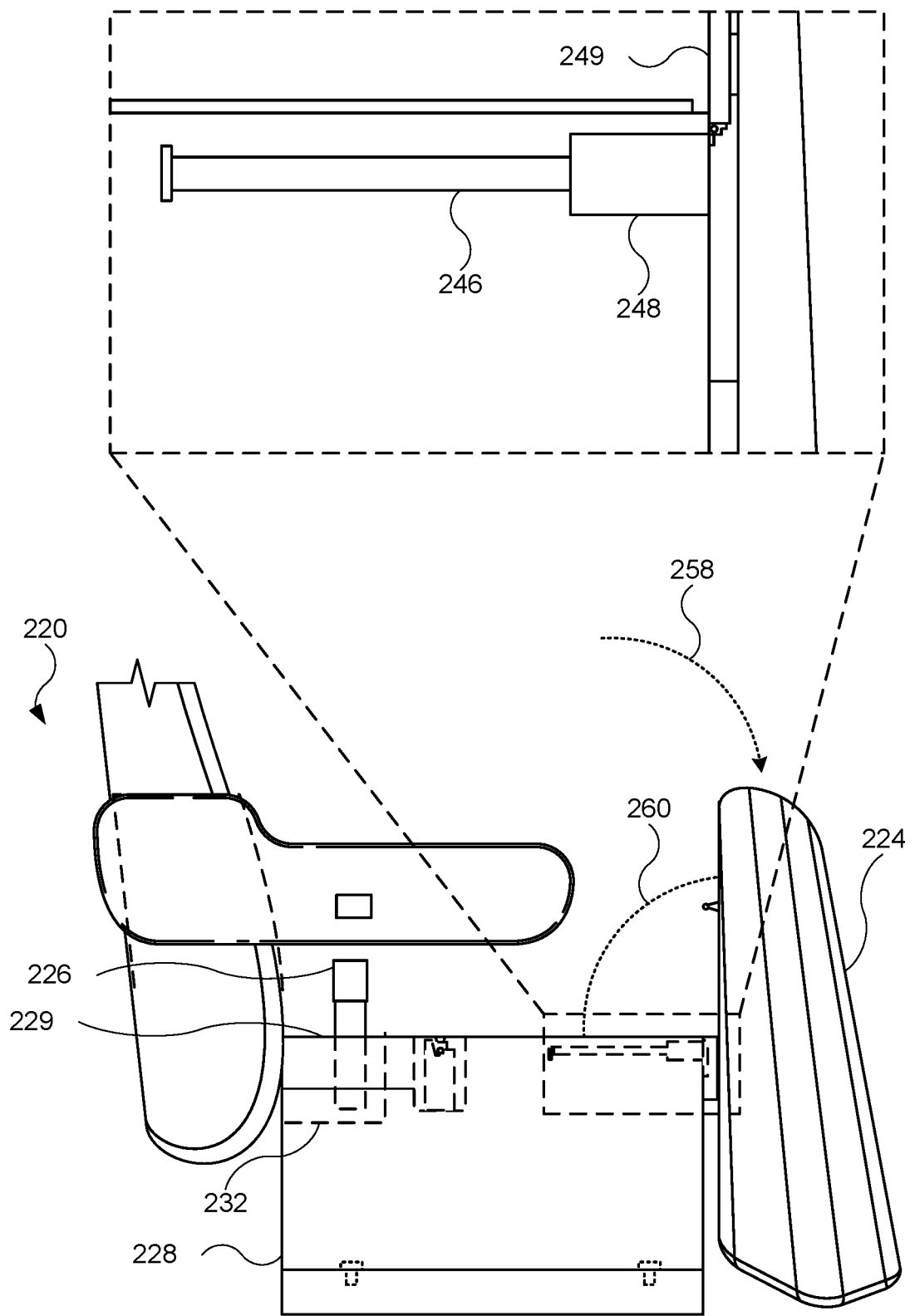

FIGS. 6-8 provide an example displacement of a seat cushion of a seat assembly. The exemplary features shown and described in FIGS. 6-8 may apply to any other seat assemblies shown and described herein.

Referring to FIG. 6, a seat assembly 216 may include a seat 220 with a seat back 222 and a seat cushion 224. The seat 220 may take the form of a rear driver's side seat of a vehicle (not shown in FIG. 6) or a rear passenger's side seat of the vehicle. When the seat assembly 216 includes, for example, three seats, the seat 220 may take the form of a middle seat of the vehicle. The seat 220 may include a platform 228. The seat assembly 216, including the seat 220, may secure with a vehicle (not shown in FIG. 6) by way of bolting the platform 228, using bolts (shown, not labeled) to a seat base 244. In one or more implementations, the seat base 244 is part of a vehicle (e.g., part of a floorboard of the vehicle), as a non-limiting example. However, other ways for securing the seat 220 are possible. For example, in one or more implementations, the platform 228 includes one or more hooks (alternative to or in addition to bolts) that are designed to hook to a bar located in the seat base 244. Using bolts and/or hooks, the platform 228 of seat assembly 216 may removably couple to the seat base 244. Based on the several ways for securing the seat assembly 216, the seat assembly 216 may be integrated with the vehicle when, for example, the vehicle is purchased by an end user (e.g., consumer). Alternatively, the seat assembly 216 may take the form of a standalone seat assembly adaptable to, or integrable with, a variety of vehicles.

The seat 220 may further include a seat belt receptacle 226 positioned in a pocket 232 formed in the platform 228. Based on the position of the seat cushion 224 in FIG. 6, the seat cushion 224 covers the seat belt receptacle 226 and the platform 228. However, the seat cushion 224 may be displaced. For example, as shown in the enlarged view 242a, the platform 228 may include a guide rail 246 and a slide 248. The slide 248 may be coupled to the seat cushion 224 and may be capable of moving, in conjunction with the seat cushion 224, along the guide rail 246. Also, the slide 248 may include a hinge 249 that allows for additional movement of the seat cushion 224. This will be shown below.

As shown in the enlarged view 242b, the platform 228 may further include a seat lock 250. The seat lock 250 may secure the seat cushion 224, thus preventing the seat cushion 224 from unwanted movement. The seat 220 may further include a button 252 that, in response to actuation (e.g., in response to being depressed), causes the seat lock 250 release the seat cushion 224, thereby allowing displacement of the seat cushion 224. As shown, the button 252 is located on an arm rest 254 of the seat 220. However, other locations (e.g., interior frame or surface of a vehicle) are possible.

Referring to FIG. 7, the seat cushion 224 of the seat 220 is displaced, relative to the seat back 222 (for example), in a direction shown by an arrow 256. The arrow 256 represents linear, or substantially linear, displacement of the seat cushion 224. In this regard, the seat cushion 224 may move laterally with respect to the seat back 222. As shown in the enlarged view 242a, the slide 248 moves along the guide rail 246, thus allowing the seat cushion 224 to be displaced. Also, as shown in the enlarged view 242b, the seat lock 250 releases the seat cushion 224, with the release of the seat lock 250 based on depressing the button 252. When the seat lock 250 releases the seat cushion 224, the seat cushion 224 may be displaced (e.g., manually displaced) in the direction of the arrow 256. Although not shown, the platform 228 may include a spring or other biasing mechanism that displaces the seat cushion 224 when the button 252 is depressed.

Referring to FIG. 8, the seat cushion 224 of the seat 220 is further displaced, relative to the seat back 222 (for example), in a direction shown by an arrow 258. The arrow 258 represents an angular displacement (e.g., rotational movement) of the seat cushion 224. As a result, the platform 228 is uncovered by the seat cushion 224 and exposed, thus exposing and permitting access to a surface 229 of the platform 228 for a child seat (not shown in FIG. 8). In order for the angular displacement of the seat cushion 224 to occur, the hinge 249 (shown in the enlarged view) of the slide 248 moves and allows for the seat cushion 224 to rotate. In this regard, an angle 260 between the seat cushion 224 and the platform 228 (e.g., an upper surface of the platform 228) may be approximately in the range of 75 to 110 degrees. In one or more implementations, the angle 260 is 90 degrees, or approximately 90 degrees. Accordingly, the seat cushion 224 may be designed to be displaced in both a linear manner and subsequently in an angular (e.g., non-linear) manner.

Based on the position of the seat cushion 224, the seat belt receptacle 226 is also exposed, thus permitting access to the seat belt receptacle 226 to extend from the pocket 232 to receive a seat belt (not shown in FIG. 8). Additionally, although not expressly shown, the platform 228 may receive a mat on the surface 229.

Figure 9:
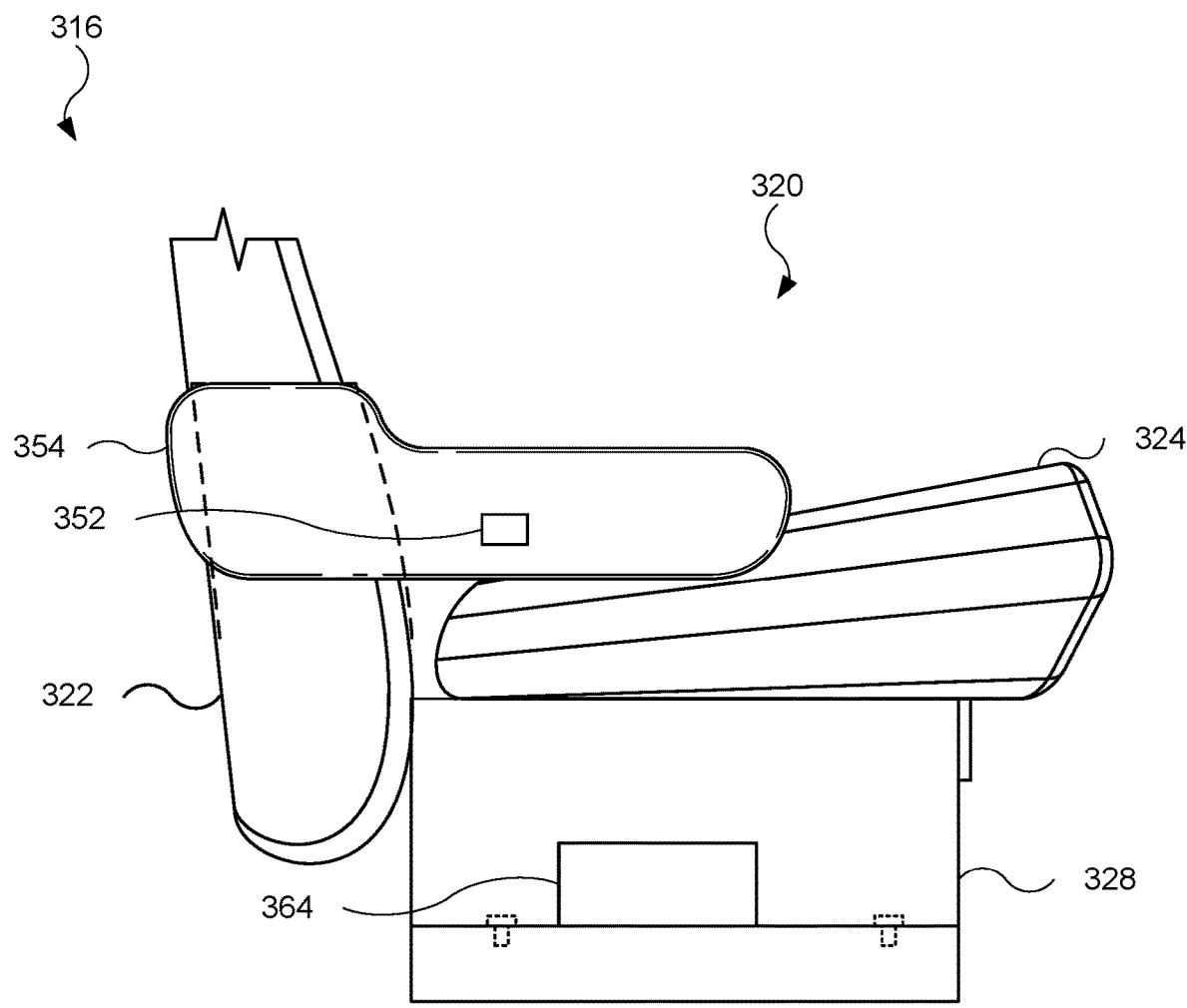
FIG. 9 illustrates an alternate example of a seat assembly with a motor, in accordance with aspects of the present disclosure.

Referring to FIG. 9, a seat assembly 316 may include a seat 320 with a seat back 322 and a seat cushion 324. The seat 320 further includes a platform 328. The seat 320 may further include a motor 364 located in the platform 328. In one or more implementations, the motor 364 is an electric motor. The seat 320 may further include a button 352 located on an arm rest 354. When the button 352 is depressed, the motor 364 may provide a mechanical force to displace the seat cushion 324. For example, the motor 364 may displace the seat cushion 324 in a manner similar to what is shown for the seat cushion 224 (e.g., a linear and an angular movement, shown in FIGS. 7 and 8, respectively).

Figure 10:
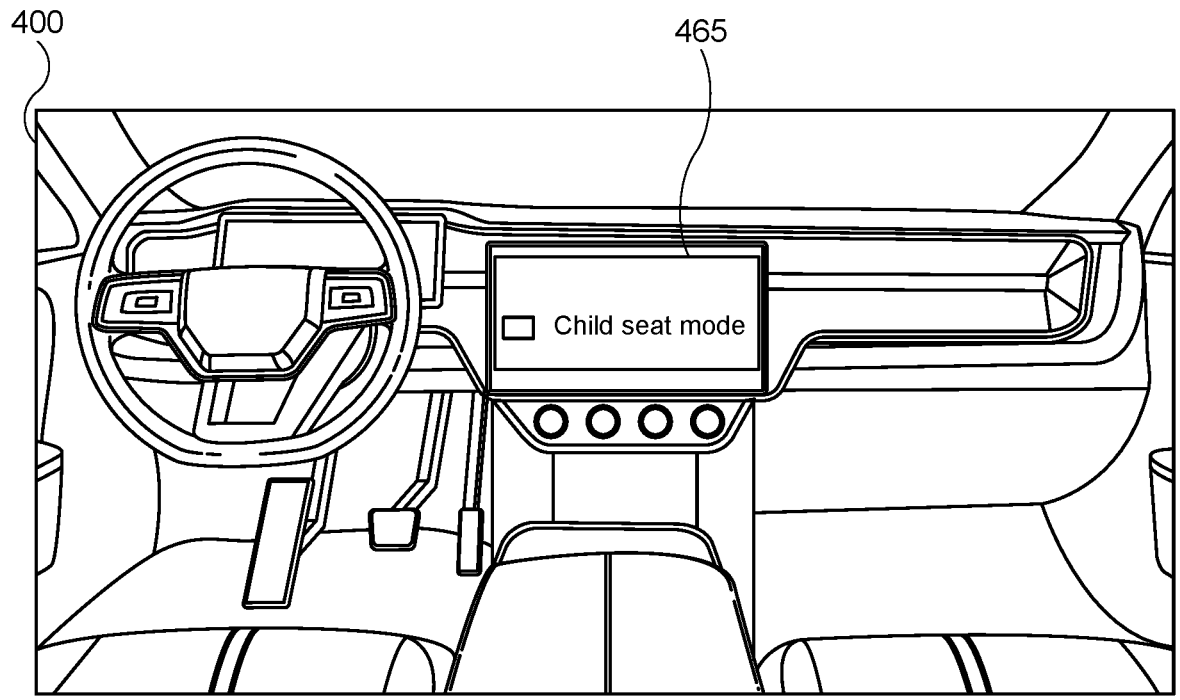
FIG. 10 illustrates an interior of a vehicle, showing a display providing information for moving a seat cushion, in accordance with aspects of the present disclosure.

Referring to FIG. 10, an interior view of a vehicle 400 shows a display 465 of the vehicle 400. In one or more implementations, the display 465 includes a touch display (e.g., capacitive touch display) capable of receiving user inputs or gestures. As shown, the display 465 may provide a virtual button and an option (e.g., "Child seat mode") to displace a seat cushion (not shown in FIG. 10) of the vehicle 400 in a manner previously described. Accordingly, at least some vehicles described herein may be equipped with a display that provides as an additional or alternate to a button (e.g., the button 352 shown in FIG. 9).

Figure 11:
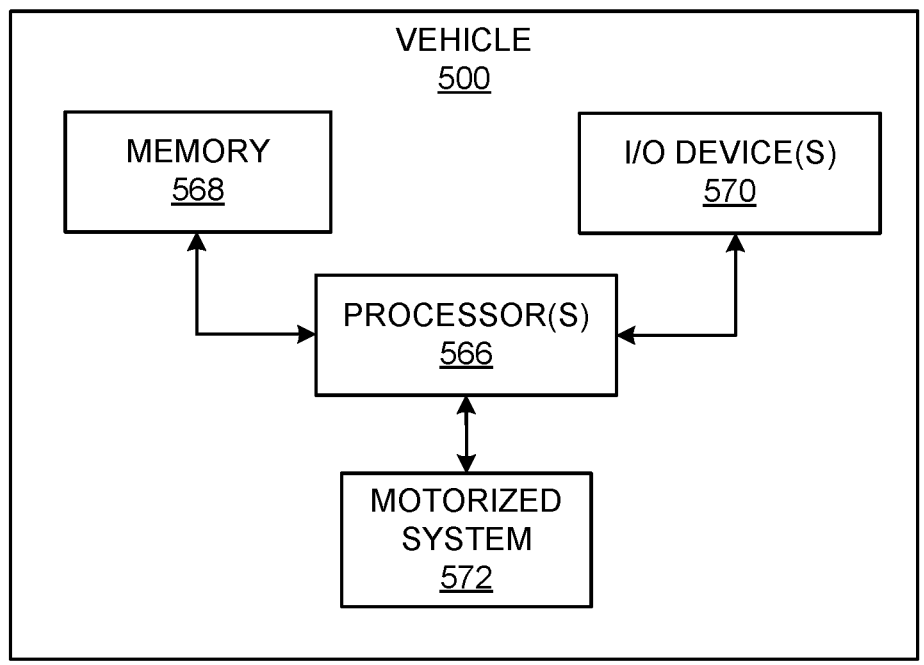
FIG. 11 illustrates a block diagram of a vehicle, showing a system for moving a seat cushion, in accordance with aspects of the present disclosure.

Referring to FIG. 11, a block diagram of a vehicle 500 is shown. The vehicle 500 may include one or more processors 566. The one or more processors 566 may include processing circuitry, such as a central processing unit (CPU), a graphics processing unit (GPU), one or more microcontrollers, an application specific integrated circuit (ASIC), or a combination thereof, as non-limiting examples. The vehicle 500 may further include memory 568 that stores instructions and/or code, each of which being executable by the one or more processors 566. The memory 568 may include read-only memory (ROM) and or random access memory (RAM). The vehicle 500 may further include one or more input-output devices 570. For example, the input-output devices 570 may include a button or a touch input display, as non-limiting examples. The vehicle 500 may further include a motorized system 572. As non-limiting examples, the motorized system 572 may include a motor (e.g., motor 364 shown in FIG. 9), an actuator, or a combination thereof.

In one or more implementations, an input to one of the one or more input-output devices 570 causes a corresponding input to the one or more processors 566. The one or more processors 566 may execute instructions or code stored on the memory 568 and provide instructions causing the motorized system 572 to displace a seat cushion in a manner similar to displacement for the seat cushion 224 (shown in FIGS. 7 and 8).

Figure 12:
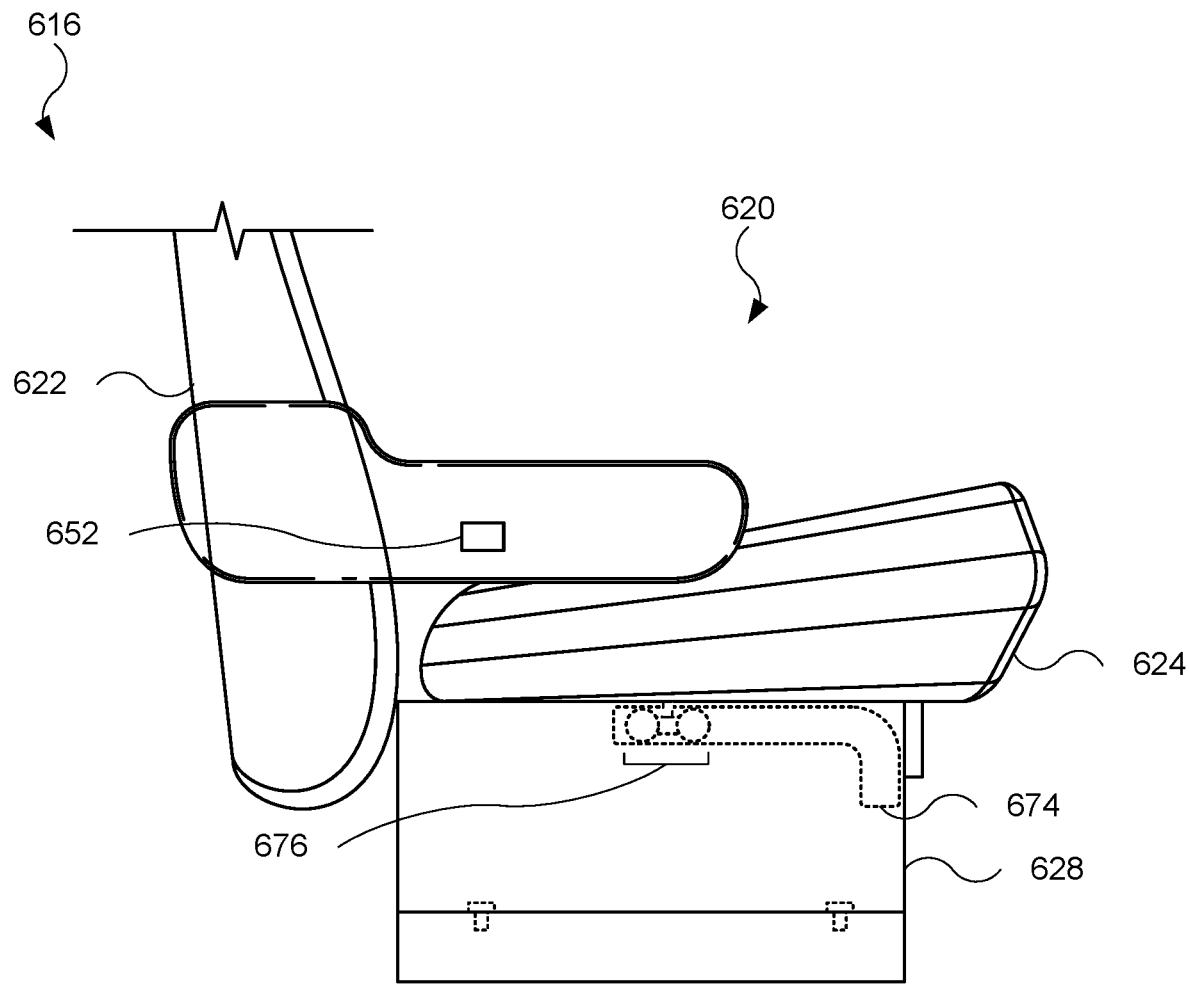
FIG. 12, FIG. 13, and FIG. 14 illustrate respective side views of a seat assembly, showing alternate features for moving a seat cushion of a seat assembly, in accordance with aspects of the present disclosure.
Figure 13:
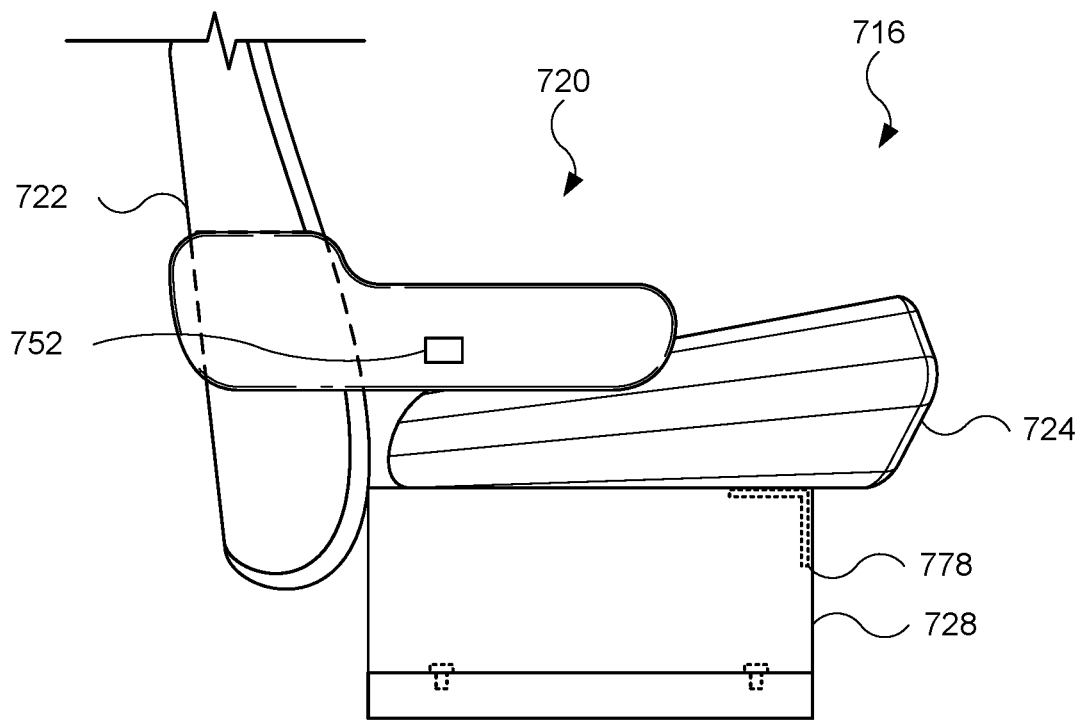
Figure 14:
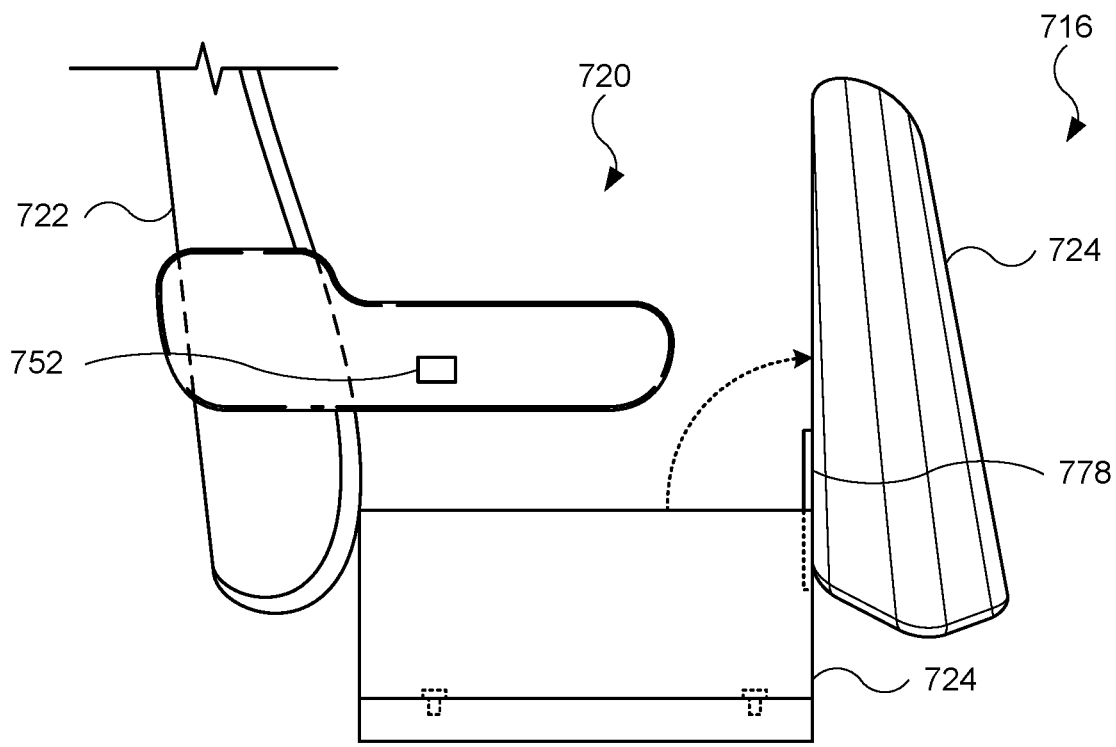

FIGS. 12-14 show and describe alternate implementations of seat assemblies. The seat assemblies shown and described in FIGS. 12-14 may include at least some features described herein for a seat assembly.

Referring to FIG. 12, a seat 616 may include a seat 620 with a seat back 622 and a seat cushion 624. Further, the seat 620 may include a platform 628. As shown, the platform 628 may include a track 674. The seat 620 may include one or more wheels 676 coupled to the seat cushion 624. The one or more wheels 676 are designed to move (e.g., roll) along the track 674, thus allowing displacement of the seat cushion 624. For example, based upon movement of the one or more wheels 676 through the track 674, the seat cushion 624 may be displaced in a manner similar to that of the seat cushion 224 (shown in FIGS. 7 and 8). In this regard, the seat 620 may include a button 652, which may release a seat lock (not shown in FIG. 12) and allow for displacement of the seat cushion 624 to expose an upper surface of the platform 628 for a child seat.

Referring to FIG. 13 and FIG. 14, a seat assembly 716 may include a seat 720 with a seat back 722 and a seat cushion 724. Further, the seat 720 may include a platform 728, with the platform 728 having a hinge 778. Based upon movement of the hinge 778, the seat cushion 724 may be displaced (e.g., rotate as shown in FIG. 14) in a manner similar to the rotation of the seat cushion 224 (shown in FIG. 8). Accordingly, the seat cushion 724 may generally move in one direction (e.g., a rotational direction), thus reducing the overall movement of the seat cushion 724. Further, the seat 720 may include a button 752, which may release a seat lock (not shown in FIGS. 13 and 14) and allow for displacement of the seat cushion 724 to expose an upper surface of the platform 728 for a child seat.

Figure 15:
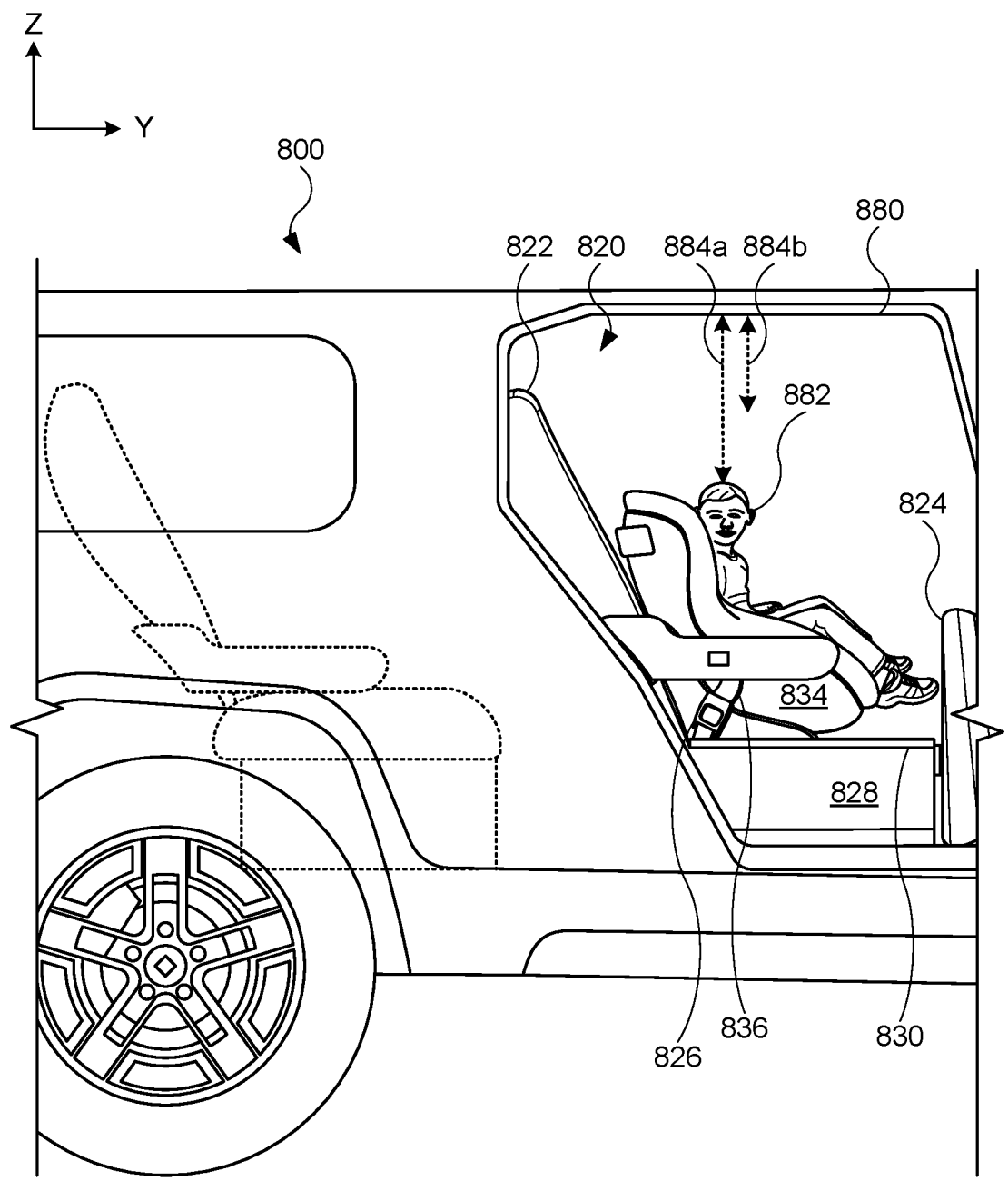
FIG. 15 illustrates a side view partially showing a vehicle with a seat assembly, further showing a child seat and a child in the child seat subsequent to displacement of a seat cushion of the seat assembly, in accordance with aspects of the present disclosure.

Referring to FIG. 15, a vehicle 800 may include a seat 820 (part of a seat assembly) with a seat back 822 and a seat cushion 824. The seat 820 may further include a platform 828. As shown, the seat cushion 824 is displaced and a child seat 834 is secured to the seat 820 at the platform 828 by a seat belt 836 passing through the child seat 834 and secured to a seat belt receptacle 826. The seat belt receptacle 826 may be representative of an additional seat belt receptacle (not shown) that is connected to the seat belt 836. Further, a mat 830 is located on an upper surface of the platform 828 and positioned between the child seat 834 and the platform 828. The vehicle 800 may further include a door frame 880. For purposes of illustration, a door is not shown.

Further, a child 882 is positioned in the child seat 834. As shown, a dimension 884a between the head of the child 882 and the door frame 880 represents a clearance, or space, between the head of the child 882 and the door frame 880. Based on the displacement of the seat cushion 824, as shown in FIG. 15, the child seat 834 may be positioned on the platform 828 (with the mat 830 intervening). Conversely, a dimension 884b represents a clearance between the head of the child 882 and the door frame 880 if the seat cushion 824 is not displaceable and the child seat 834 is positioned on the seat cushion 824 (positioned horizontally). As can be observed, the dimension 884a is greater than the dimension 884b. Thus, the dimension 884a, based on the seat cushion 824 being displaced, effectively lowers the position (e.g., along a Z-axis of Cartesian coordinates) of the child seat 834, thus lowering the position of the child 882 (including the head of the child 882) and increasing the clearance over traditional seats with non-movable seat cushions. Beneficially, the seat cushion 824, when displaced, may promote case of putting the child 882 into the vehicle 800 (e.g., into the child seat 834) and removing the child 882 from the vehicle 800.

Figure 16:
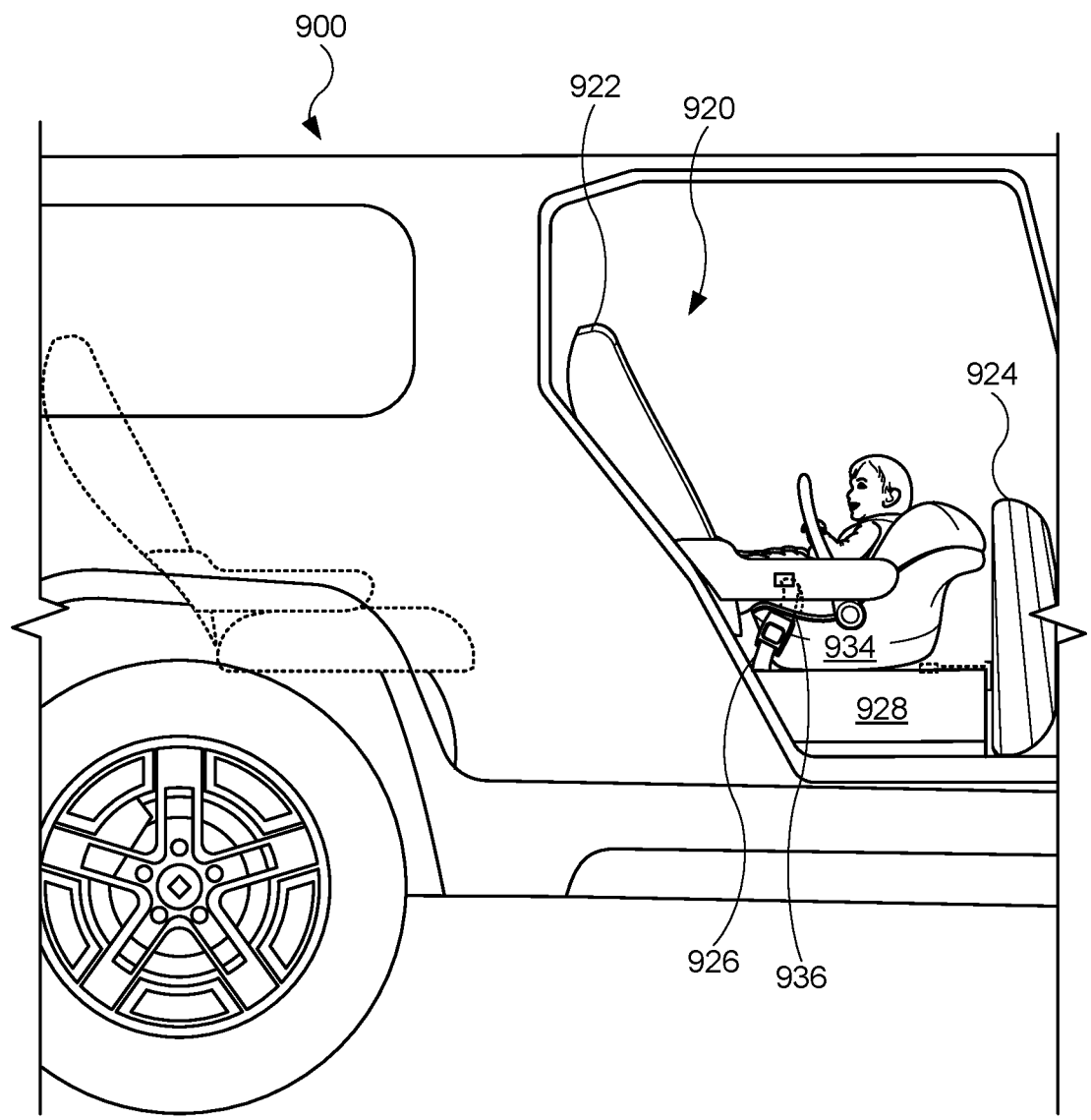
FIG. 16 illustrates a side view partially showing a vehicle with a seat assembly, further showing an alternate child seat and a child in the alternate child seat subsequent to displacement of a seat cushion of the seat assembly, in accordance with aspects of the present disclosure.

Some of the prior examples of child seats include toddler child seats. However, referring to FIG. 16, a vehicle 900 may include a seat 920 (part of a seat assembly) with a seat back 922 and a seat cushion 924. The seat 920 may further include a platform 928. As shown, the seat cushion 924 is displaced and a child seat 934 is secured to the seat 920 at the platform 928 by a seat belt 936 passing through the child seat 934 and secured to a seat belt receptacle 926. The seat belt receptacle 926 may be representative of an additional seat belt receptacle (not shown) that is connected to the seat belt 936. In one or more implementations, the child seat 934 is an infant seat. Accordingly, the seat 920 (representative of other seats shown and described herein in this regard) may also accommodate infant seats.

Figure 17:
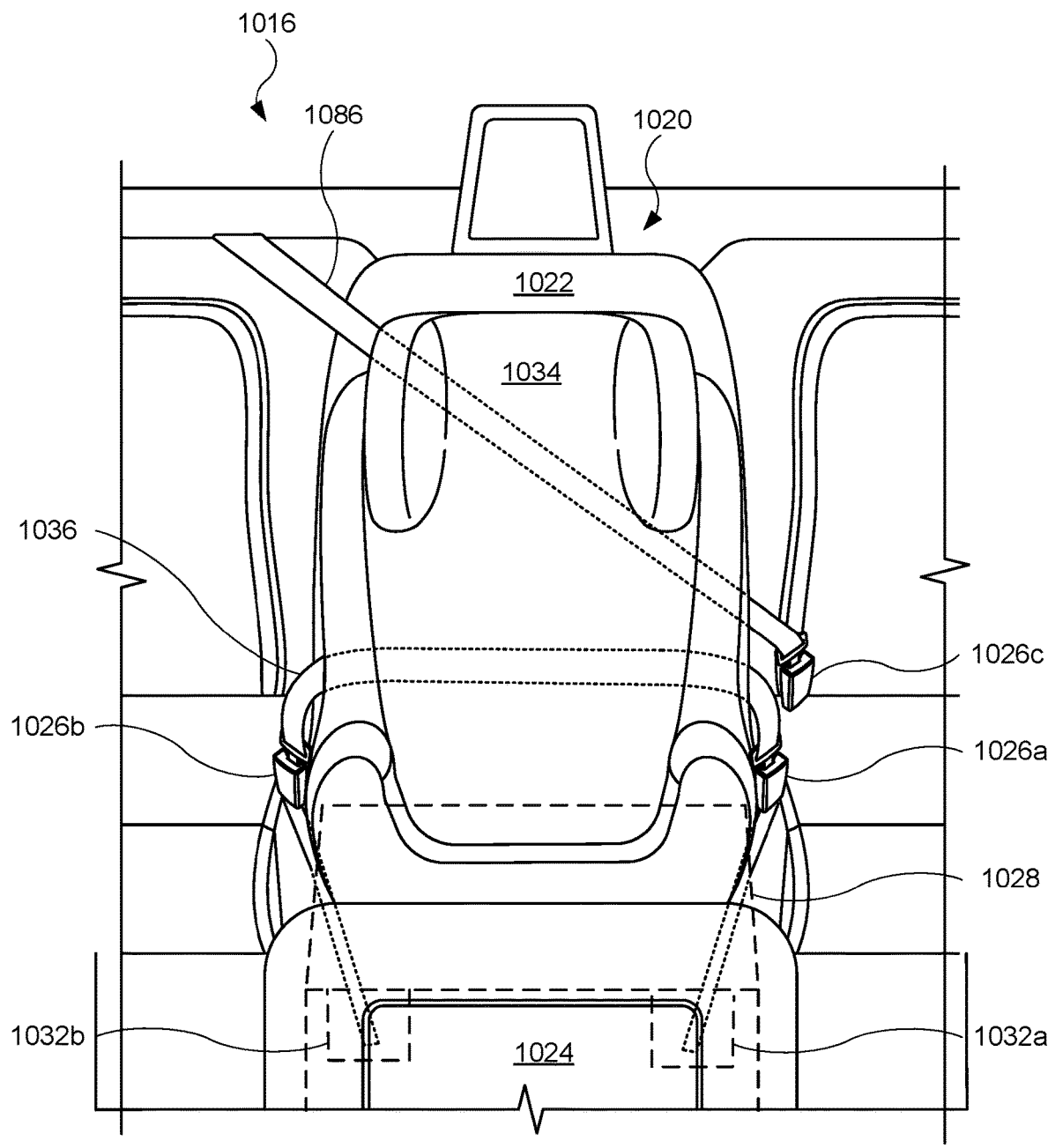
FIG. 17 illustrates a side view partially showing a vehicle with a seat assembly, further showing a seat assembly with three seat belt receptacles used with a child seat, in accordance with aspects of the present disclosure.

Referring to FIG. 17, a seat assembly 1016 may include a seat 1020 with a seat back 1022 and a seat cushion 1024, with the seat cushion 1024 displaceable and movable with respect to the seat back 1022. As shown, a child seat 1034 is positioned on a platform 1028 of the seat 1020. The seat assembly 1016 may further include a seat belt receptacle 1026a, a seat belt receptacle 1026b, and a seat belt receptacle 1026c, some of which may be part of the seat 1020. Additionally, a seat belt 1036 may pass through the child seat 1034, with respective ends of the seat belt 1036 secured to the seat belt receptacles 1026a and 1026b. Further, the seat 1020 may include a seat belt 1086 (e.g., shoulder strap or shoulder harness) that passes through the child seat 1034 and includes an end that secures to the seat belt receptacle 1026c. Accordingly, the seat assembly 1016, which may be representative of at least some seat assemblies described herein, may include a seat (e.g., the seat 1020) with three seat belt receptacles. Further, in one or more implementations, the platform 1028 may include a pocket 1032a and a pocket 1032b, with seat belt receptacle 1026a and the seat belt receptacle 1026b being located in the pocket 1032a and the pocket 1032b, respectively.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A. B. and C.

When an element is referred to herein as being "connected" or "coupled" to another element, it is to be understood that the elements can be directly connected to the other element, or have intervening elements present between the elements. In contrast, when an element is referred to as being "directly connected" or "directly coupled" to another element, it should be understood that no intervening elements are present in the "direct" connection between the elements. However, the existence of a direct connection does not exclude other connections, in which intervening elements may be present.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, one or more implementations, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A seat assembly, comprising:
a platform, comprising:
a seat belt receptacle, and
a surface,
wherein:
in a first position, the platform is covered by a seat cushion and the seat belt receptacle is covered by the seat cushion, and
in a second position, the platform is uncovered by the seat cushion, thereby permitting access to i) the surface for a child seat and ii) the seat belt receptacle for securing the child seat to the platform at the surface.

2. The seat assembly of claim 1, wherein the platform comprises:
a guide rail; and
a slide coupled to the guide rail and the seat cushion.

3. The seat assembly of claim 2, wherein the slide is movable along the guide rail from the first position to the second position.

4. The seat assembly of claim 1, further comprising a pocket formed in the platform, wherein the seat belt receptacle is located within the pocket.

5. The seat assembly of claim 4, further comprising:
a supplemental seat belt comprising a first end and a second end opposite the first end, the supplemental seat belt configured to pass through the child seat; and
a second seat belt receptacle, wherein in the second position, the first end is configured to couple to the seat belt receptacle and the second end is configured to couple to the second seat belt receptacle.

6. The seat assembly of claim 1, further comprising a seat back, wherein the seat cushion is configured to rotate relative to the seat back.

7. The seat assembly of claim 1, wherein the platform allows the seat cushion to rotate from the first position to the second position.

8. The seat assembly of claim 1, wherein the seat cushion is configured to move from the first position to the second position in response to actuation of a button.

9. The seat assembly of claim 1, further comprising a seat lock configured to secure the seat cushion in the first position.

10. The seat assembly of claim 1, wherein in the second position, the seat belt receptacle is configured to secure a belt that passes through the child seat.

11. A seat assembly, comprising:
a platform configured to removably couple with a vehicle;
a seat back coupled to the platform;
a seat cushion coupled with the platform, the seat cushion configured to move relative to the seat back, thereby exposing the platform for a child seat;
a first seat belt receptacle configured to secure with a first end of a belt that passes through the child seat; and
a second seat belt receptacle configured to secure with a second end of the belt, wherein in response to the seat cushion covering the platform, the seat cushion covers the second seat belt receptacle.

12. The seat assembly of claim 11, wherein the seat cushion is configured to rotate relative to the seat back.

13. The seat assembly of claim 11, wherein the seat cushion is configured to move laterally with respect to the seat back.

14. The seat assembly of claim 11, further comprising:
a pocket formed in the platform,
wherein the second seat belt receptacle is located in the pocket.

15. A vehicle, comprising:
a seat comprising:
a seat back;
a seat cushion configured to move:
in a first direction away from the seat back, and
in a second direction different from the first direction; and
a platform configured to receive a child seat subsequent to the seat cushion moving in the second direction, the platform comprising:
a surface,
a seat belt receptacle,
a guide rail, and
a slide coupled to the guide rail and the seat cushion,
wherein:
in a first position, the platform and the seat belt receptacle are covered by the seat cushion, and
in a second position, the platform is uncovered by the seat cushion, thereby permitting access to i) the surface for the child seat and ii) the seat belt receptacle for securing the child seat to the platform at the surface.

16. The vehicle of claim 15, wherein the seat cushion is configured to rotate in the second direction.

17. The vehicle of claim 15, wherein the seat comprises a rear seat that is adaptable to be positioned in at least one of a driver's side of the vehicle, a passenger's side of the vehicle, or a middle of the vehicle.

18. The vehicle of claim 15, wherein the platform comprises:
a pocket, wherein the pocket and the seat belt receptacle are exposed subsequent to the seat cushion moving in the second direction.

19. The vehicle of claim 15, further comprising a button, wherein in response to actuation of the button, the seat cushion moves in the first direction and subsequently in the second direction.

20. The vehicle of claim 15, further comprising a touch display, wherein in response to a touch input to the touch display, the seat cushion moves in the first direction and subsequently in the second direction.

* * * * *